United States Patent
Rossi et al.

(10) Patent No.: US 12,000,286 B2
(45) Date of Patent: Jun. 4, 2024

(54) GEAR WHEEL HAVING AN IMPROVED PROFILE

(71) Applicant: Settima Meccanica S.r.l., San Giorgio Piacentino (IT)

(72) Inventors: Manuele Rossi, San Giorgio Piacentino (IT); Andrea Ceruti, San Giorgio Piacentino (IT)

(73) Assignee: Settima Meccanica S.r.l., San Giorgio Piacentino (IT)

( * ) Notice: Subject to any disclaimer, the term of this patent is extended or adjusted under 35 U.S.C. 154(b) by 0 days.

(21) Appl. No.: 17/630,378

(22) PCT Filed: Jul. 30, 2020

(86) PCT No.: PCT/EP2020/071508
§ 371 (c)(1),
(2) Date: Jan. 26, 2022

(87) PCT Pub. No.: WO2021/019014
PCT Pub. Date: Feb. 4, 2021

(65) Prior Publication Data
US 2022/0282621 A1    Sep. 8, 2022

(30) Foreign Application Priority Data
Aug. 1, 2019   (IT) .................. 102019000013713

(51) Int. Cl.
*F03C 2/00*    (2006.01)
*B23F 15/08*   (2006.01)
(Continued)

(52) U.S. Cl.
CPC .............. *F01C 1/084* (2013.01); *B23F 15/08* (2013.01); *F04C 2/084* (2013.01); *F04C 2/16* (2013.01); *Y10T 29/49467* (2015.01)

(58) Field of Classification Search
CPC .. F04C 2/084; F04C 2/126; F04C 2/16; F01C 1/084; Y10T 29/49467; Y10T 29/49476;
(Continued)

(56) References Cited

U.S. PATENT DOCUMENTS 2,956,735 A * 10/1960 Breelle .................. F04C 18/20
                                                    418/200
3,180,227 A *  4/1965 Schlichthorlein ....... B23F 19/06
                                                    409/37
(Continued)

FOREIGN PATENT DOCUMENTS

CN        107717137 A  *  2/2018  ............ B23F 19/125
DE       4338876 A1   *  5/1995  .............. F04C 2/084
(Continued)

OTHER PUBLICATIONS

DE-4338876-A1—Pippes et al.—Hydraulic geared machine e.g. pump or motor—May 18, 1995—the English Machine Translation (Year: 1995).*
(Continued)

*Primary Examiner* — Theresa Trieu
(74) *Attorney, Agent, or Firm* — Akerman LLP

(57) ABSTRACT

A gear wheel (10) for a hydraulic apparatus is rotatable about an axis of rotation (H-H) and comprises a plurality of teeth (11) having a sectional profile (P) and being adapted to mesh with respective teeth of another gear wheel during a rotational motion about the axis of rotation (H-H), wherein at least one tooth (11) is shaped so as to have at least one cutting edge (12) configured to remove material, in particular chips, from a body which is contacted by the cutting edge during the rotation of the gear wheel (10), wherein the cutting edge (12) is defined by at least one groove (14) which is lowered by amount from 0.2% to 5% of the height
(Continued)

(H') of the tooth (11), said the groove (14) decreasing away from the cutting edge (12) along the profile (P).

18 Claims, 8 Drawing Sheets

(51) Int. Cl.
| | |
|---|---|
| *F01C 1/08* | (2006.01) |
| *F03C 4/00* | (2006.01) |
| *F04C 2/00* | (2006.01) |
| *F04C 2/08* | (2006.01) |
| *F04C 2/16* | (2006.01) |
| *F04C 18/00* | (2006.01) |

(58) Field of Classification Search
CPC .... B23F 1/02; B23F 1/023; B23F 9/02; B23F 9/025; B23F 15/08; B23F 19/002; B23F 19/005; B23F 19/12; B23F 19/125
See application file for complete search history.

(56) References Cited

U.S. PATENT DOCUMENTS

| | | | | |
|---|---|---|---|---|
| 3,709,055 A | * | 1/1973 | Grove | F16H 55/08 418/206.5 |
| 3,907,470 A | * | 9/1975 | Harle | F01C 1/084 418/170 |
| 3,986,801 A | * | 10/1976 | Garland | F04C 18/082 418/201.3 |
| 4,492,546 A | * | 1/1985 | Kasuya | F01C 1/084 418/201.3 |
| 6,217,409 B1 | * | 4/2001 | Stadtfeld | B23F 19/002 451/900 |
| 2014/0271314 A1 | * | 9/2014 | Morselli | F04C 2/084 418/206.5 |
| 2016/0047462 A1 | * | 2/2016 | Cagnani | F04C 2/084 418/205 |
| 2018/0023561 A1 | * | 1/2018 | Rossi | F01C 1/18 418/201.1 |

FOREIGN PATENT DOCUMENTS

| | | |
|---|---|---|
| DE | 10 2012 209775 A1 | 12/2013 |
| GB | 1 438 917 A | 6/1976 |
| IT | 201600076227 A1 | 1/2018 |

OTHER PUBLICATIONS

CN-107717137-A—Dong et al.—Tooth crest rounding method—Feb. 23, 2018—the English Machine Translation (Year: 2018).*
International Search Report dated Aug. 25, 2020 issued in connection with PCT/EP2020/071508.
Written Opinion of the International Searching Authority dated Feb. 4, 2021 issued in connection with PCT/EP2020/071508.

* cited by examiner

GEAR WHEEL HAVING AN IMPROVED PROFILE

CROSS-REFERENCE TO RELATED APPLICATIONS

This application is a national phase of PCT/EP2020/071508, filed Jul. 30, 2020, and claims priority to Italian Patent Application No. 102019000013713, filed Aug. 1, 2019, the entire contents of both of which are hereby incorporated by reference.

FIELD OF APPLICATION

The present invention refers to a gear wheel for a hydraulic apparatus, for example for a geared rotary positive displacement pump, and the following description is made with reference to this application field with the only purpose of simplifying the exposition thereof.

PRIOR ART

As is well known, geared rotary positive displacement pumps normally comprise two gear wheels (or gears) of which one, called driving wheel, is connected to a driving shaft and causes the rotation of the other wheel, called the driven wheel. Each gear wheel comprises a plurality of teeth, straight or helical, which are configured to mesh with each other according to successive meshing configurations during the rotation of the wheels.

According to a known solution, designed in the past by the Applicant and illustrated in FIGS. 1 and 2, a geared rotary positive displacement pump is equipped with a pair of gear wheels 1 whose teeth 2 have a profile characterized by a round or arched shape at the top.

A gear wheel of this type allows a continuous contact between the profiles of the two meshing wheels, in whatever angular position they are, so that there is no fluid encapsulation between the crest and the bottom of two meshing teeth. This happens for example when the shape of the tooth at the top thereof is defined by a function describing an arc of a circle or ellipse, wherein the center thereof or the foci thereof are located inside the tooth itself between the outer diameter and the inner diameter of the gear wheel 1.

Although this known solution has numerous advantages, among which noiselessness, no encapsulation of fluid and very low pulsations on the delivery port, it does not ensure a correct interaction of the gear wheels 1 with the body or casing 3 of the pump in which they are housed.

In particular, the biggest critical issue for this type of pumps occurs during the running-in phase, where the gear wheels 1, under the load due to the pressure created on the delivery port, create their own seat in the body 3 of the pump. In fact, in the running-in phase, the gear wheels 1 contact the internal walls of the body 3 of the pump in the area close to the low pressure port and, since the wheels themselves are made of a material having a hardness greater than the material of the body 3, the geometry of the latter is altered.

In other words, under the load that is generated during the running-in phase, elastic yieldings of the gear wheels and/or different radial positioning of the said wheels with respect to the axis of rotation occur, which lead to plastic wear of the pump body 3 with an often unpredictable and potentially harmful outcome.

Still more in particular, with reference to a schematic example shown in FIG. 2, in the solution illustrated above it happens that, under the action of the force due to the pressure of the fluid transported by the gear wheels, there is an elastic yielding of the plain bearings housed in the bearing bushes of said wheels, this yielding being proportional to the operating pressure, to the length of the gear wheels and depending on the materials used. Under certain operating conditions, a mechanical interference occurs between the internal wall of the hole of the body 3 in which the wheel 1 is housed and the wheel 1 itself.

Due to the particular shape of the tooth with rounded tip, this interference therefore results in a wear phenomenon caused by plastic deformation of the material (for example aluminium, but also other materials such as cast iron are not excluded, which are ductile and malleable compared to the material of the gear wheels, normally of hardened and tempered steel) and a subsequent and consequent "spreading" of material removed as a thin layer on the free walls of the holes in the body 3.

Furthermore, during running-in, excessive frictions create energy dissipation (heat) and the aforementioned wear phenomena are even more accentuated and difficult to keep under control.

The spreading effect of the material removed and deposited in the free areas of the walls of the holes, due to the aforementioned round shape of the teeth, mainly depends on the tolerances defined during the design phase. The greater the interpenetration between the gear wheels and the body of the hydraulic system, the greater the heat generated and the volume of material removed; therefore the greater the thermal expansion and the greater the volume of material removed ("torn") and subsequently deposited ("spread").

In certain cases, the seat created by the gear wheel, once back to the starting temperature, has a deformed geometry such as to interfere with the rotation of the wheel itself. The extent of the deformation is also difficult to predict.

This phenomenon is measurable and is also found experimentally: when trying to rotate the driving wheel, the rolling is difficult and takes place in jerks, or even it is rather completely blocked. This can lead to production waste due to quality control failure.

All this has very dangerous consequences for the pump, where in cold starting there is often damage to the pump body with consequent loss of volumetric efficiency. It is therefore desirable that, during the running-in of a pump in which the gear wheels are housed for the first time, this inconvenience does not occur.

Patent application DE 10 2012 209 775 A1 discloses a pump whose gear wheels comprise a tooth equipped with a cutting edge for removing material from the pump casing, in particular when the latter is made of grey cast iron. The cutting edge is basically a pronounced protrusion of the tooth and defines an acute cutting angle.

The technical problem of the present invention is to provide a gear wheel, and a related hydraulic apparatus, having structural and functional features such as to allow overcoming the limitations and drawbacks still affecting the known solutions, in particular which does not cause a plastic deformation of the pump body with consequent spreading of material on the surface of the holes housing the gear wheels during the running-in phase.

SUMMARY OF THE INVENTION

The solution idea underlying the present invention is to provide a gear wheel whose teeth comprise a cutting element, which is arranged on the top thereof and is capable of removing material from the pump body by removing chips during the running-in phase, so as to limit or even avoid the plastic deformation of the pump body which occurs in the known solutions. The removed material is then expelled by the fluid pumped by the delivery port, with limited or even no spreading of material on the walls of the housing holes.

Based on this solution idea, the aforementioned technical problem is solved by a gear wheel for a hydraulic apparatus, the gear wheel comprising a plurality of teeth and being arranged rotatable about an axis of rotation, said teeth having a sectional profile and being adapted to mesh with respective teeth of another gear wheel during a rotational motion about the axis of rotation, wherein at least one tooth is shaped so as to have at least one cutting edge configured to remove material, in particular chip material, from a body (for example a casing) which is contacted by said cutting edge during the rotation of the gear wheel. Advantageously, the cutting edge is defined by at least one groove which is lowered by an amount from 0.2% to 5% of the height of the tooth, the groove decreasing away from the cutting edge along the profile of the tooth.

More particularly, the invention comprises the following additional and optional features, taken alone or in combination if necessary.

According to an aspect of the present invention, the groove can form a projection which protrudes with respect to the rounded profile of the tooth by an amount from 0.01 mm to 1 mm, preferably 0.03 mm. In this way, the profile of the tooth is not modified excessively, for example only a slight discontinuity is introduced along the nominal starting profile, obtaining remarkable performances of the cutting edge. The projection can have a width between 0.01 mm and 1 mm.

According to an aspect of the present invention, the cutting edge can be arranged at a top portion of the tooth, the top portion being the tooth portion farthest from the center of the primitive circle of the gear wheel.

According to an aspect of the present invention, the cutting edge can extend over the entire length of the tooth, the length of the tooth being the dimension of the tooth in a direction parallel to the axis of rotation.

According to another aspect of the present invention, each tooth of the gear wheel can comprise the cutting edge.

According to another aspect of the present invention, at least one tooth can comprise a plurality of cutting edges spaced from each other.

According to another aspect of the present invention, the cutting edge can be such as to introduce a discontinuity in the function that defines the profile of the tooth, the cutting edge being arranged at the point of discontinuity. For example, the discontinuity can be a discontinuity of the first kind.

Alternatively, the cutting edge can be such as to introduce a point of non-differentiability in the function that defines the profile of the tooth.

According to another aspect of the present invention, the profile of the tooth can be a symmetrical profile.

According to another aspect of the present invention, the cutting edge can be an edge of the groove, which is formed along a longitudinal axis of the tooth, the longitudinal axis being an axis parallel to the axis of rotation.

According to another aspect of the present invention, the cutting edge can be at a rim or edge (i.e. it is the corner) of a portion having a square shape or a wedge shape.

Additionally, the teeth can be helical (or bi-helical) teeth and the gear wheel can have a number of teeth between 5 and 21.

According to yet another aspect of the present invention, the function that defines the profile of the teeth can describe, at the top thereof, an arc of a circle centered on the axis of rotation of the gear wheel and having a diameter equal to or greater than a diameter of a hole housing said gear wheel, except for processing tolerances. The top of the teeth may be the tooth portion furthest from the center of the primitive circle of said gear wheel.

According to yet another aspect of the present invention, the cutting edge can be obtained by removing material from the tooth.

Finally, it is observed that the shape of the cutting edge can be obtained by shape grinding using a single shaped grinding wheel or a screw grinding wheel.

The present invention also refers to a hydraulic apparatus comprising a casing and a pair of gear wheels, wherein at least one gear wheel is as defined above, said gear wheels being housed in housing holes in the casing, wherein the cutting edge is configured to remove material, in particular chip material, from an inner surface of the housing holes of the casing, which is contacted by the cutting edge during the rotation of the gear wheels.

It is therefore clear that the apparatus of the present invention, equipped with two gear wheels, can comprise only one gear wheel equipped with the cutting edge according to the embodiments illustrated above, or both.

More specifically, the hydraulic apparatus can be a geared rotary positive displacement pump or a hydraulic motor.

The present invention also refers to a method for manufacturing a gear wheel of the type rotatable about an axis of rotation and comprising a plurality of teeth adapted to mesh with respective teeth of another gear wheel during a rotational motion around the axis of rotation, comprising the steps of:
  providing a body to be processed;
  forming a plurality of teeth in the body; and
  removing material from at least one tooth so as to form at least one cutting edge in said tooth, said cutting edge being configured to remove material, in particular chip material, from a body (for example a casing) which is contacted by the cutting edge during the rotation of the gear wheel. Suitably, the step of removing material comprises defining the cutting edge by means of at least one groove which is lowered by an amount from 0.2% to 5% of the height of said tooth, said groove decreasing away from the cutting edge along the profile of the tooth.

According to an aspect of the present invention, the method can comprise a step of performing a shape grinding of the tooth profile, by using a single shaped grinding wheel or a screw grinding wheel.

According to another aspect of the present invention, the method can comprise a step of grinding the diameter of the gear wheel by means of a round grinding machine.

The characteristics and advantages of the gear wheel, of the apparatus and of the method according to the invention will be apparent from the description, made hereinafter, of an embodiment thereof, given by way of indicative and non-limiting example, with reference to the enclosed drawings.

DETAILED DESCRIPTION

With reference to those figures, a gear wheel according to the present invention is globally and schematically indicated with 10.

It is worth noting that the figures represent schematic views and are not drawn to scale, but instead they are drawn so as to emphasize the important features of the invention. Moreover, in the figures, the different elements are depicted in a schematic manner, their shape varying depending on the application desired. It is also noted that in the figures the same reference numbers refer to elements that are identical in shape or function. Finally, particular features described in relation to an embodiment illustrated in a figure are also applicable to the other embodiments illustrated in the other figures.

The gear wheel 10 of the present invention is used in hydraulic apparatuses such as volumetric gear pumps (geared rotary positive displacement pumps) or also hydraulic gear motors. As will be described in greater detail below, the gear wheel 10 is used in a hydraulic apparatus comprising a pair of meshing gear wheels, the wheels being mounted so as to be mutually rotatable in a casing or housing body between an inlet side and an outlet side of a fluid having, in use, a flow which is substantially transverse with respect to the axes of rotation of the gear wheels. In their reciprocal rotation, these meshing gear wheels have progressive meshing configurations.

In particular, the present invention will be illustrated below according to a preferred example in which the gear wheel 10 is used in a gear pump, even if the disclosed teachings will also be applicable to other hydraulic systems, such as a motor.

Figure 1:
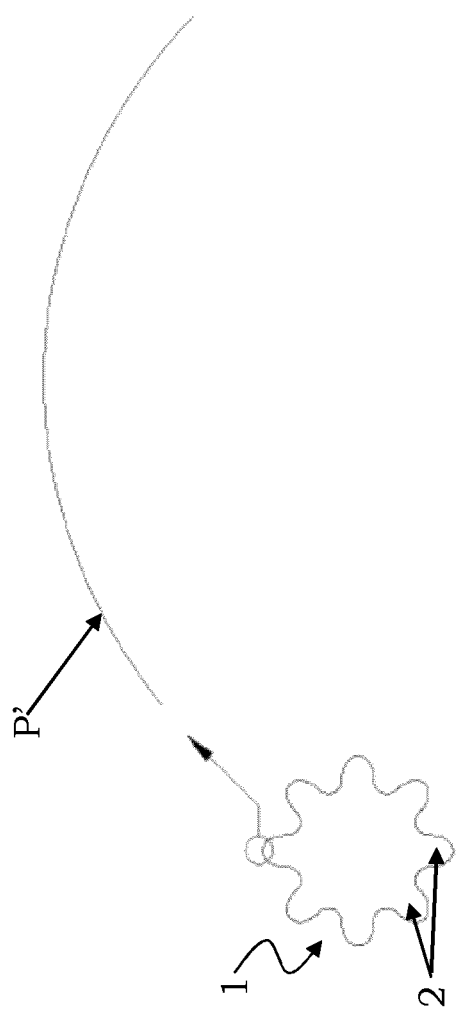
FIG. 1 schematically shows a profile of a gear wheel according to the known solutions.
Figure 2:
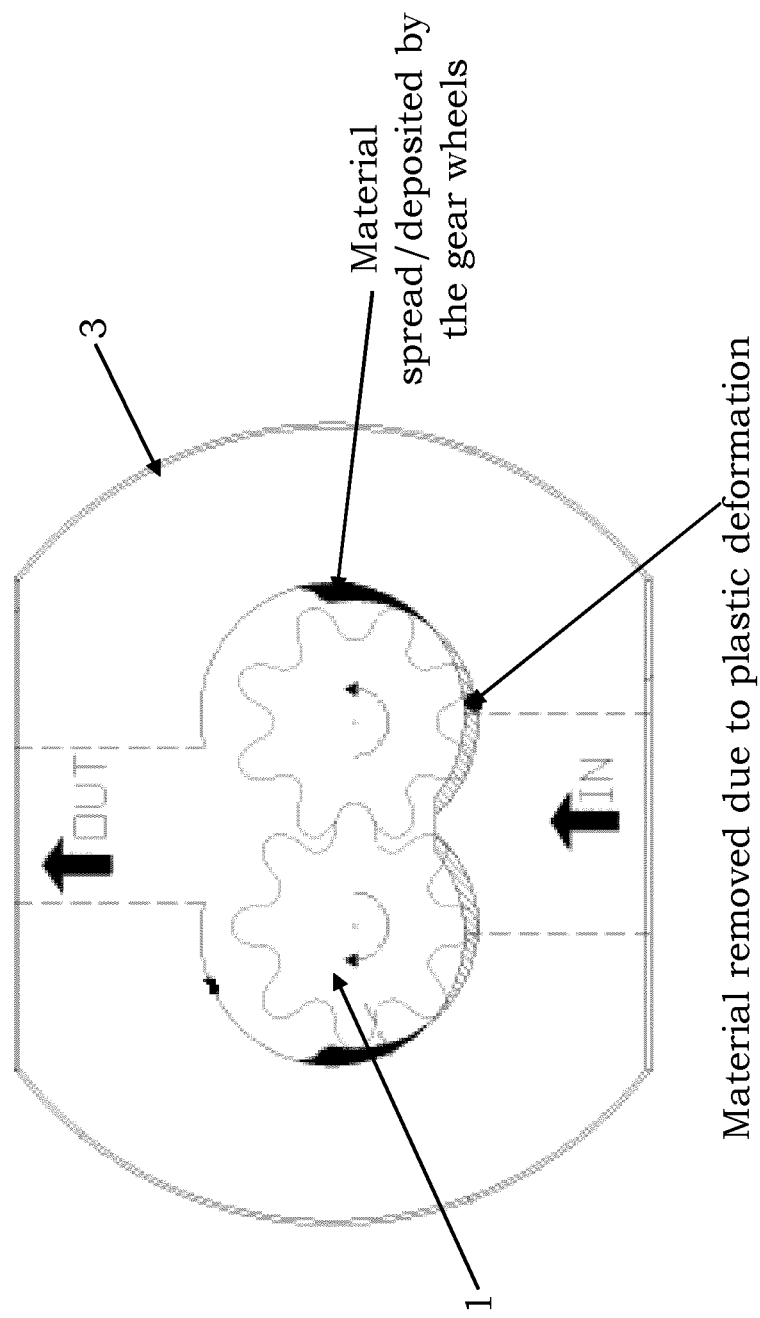
FIG. 2 schematically shows a hydraulic apparatus comprising gear wheels according to the known solutions.
Figure 3:
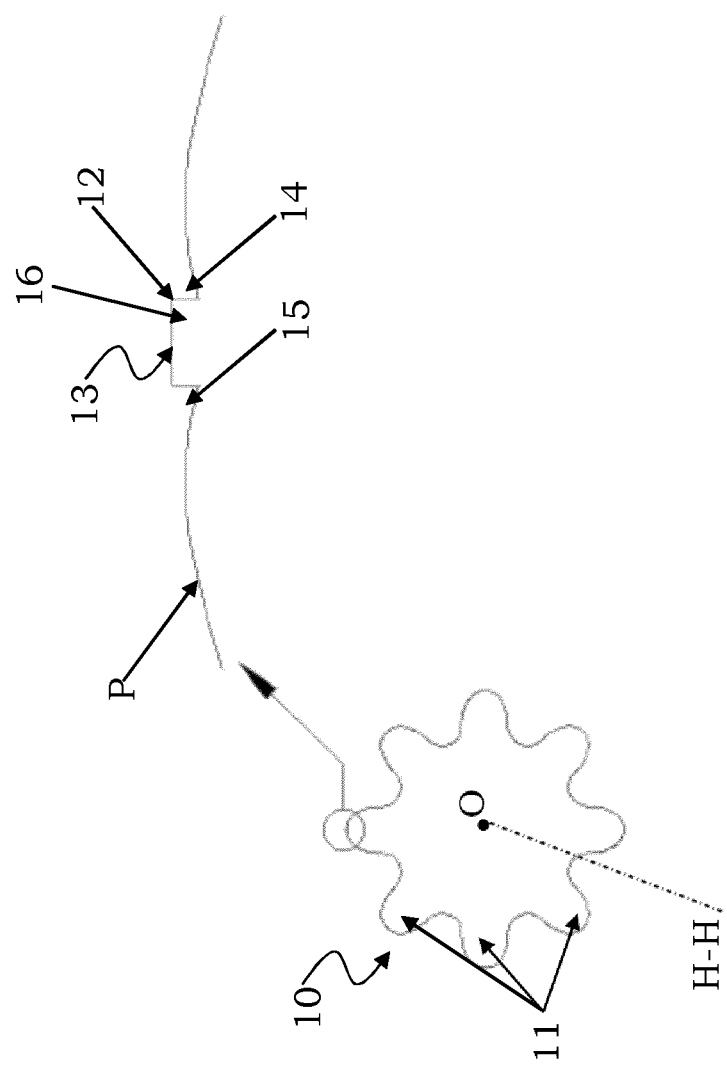
FIG. 3 schematically shows a profile of a gear wheel according to the present invention.

With particular reference to FIG. 3, the gear wheel 10 of the present invention, also called rotor in this field, comprises a main body which is processed so as to have a plurality of teeth 11, which are adapted to mesh with respective and conjugate teeth of another gear wheel during rotation.

More specifically, the gear wheel 10 is arranged so as to be rotatable about an axis of rotation, indicated herein as the axis H-H, which is perpendicular to the plane of the figure and configured as an axis passing through the center O of the gear wheel 10, i.e. from the center of the primitive circle. Each tooth 11 has a cross-sectional profile P defined by a determined function on a plane orthogonal to this axis of rotation H-H.

In particular, the function that defines the profile P of the teeth 11 may describe an arc of a circle at the top of the tooth, said circle being centered in the center O and having a diameter substantially equal to or greater than that of the holes housing the wheel in the pump body, except for processing tolerances. In an embodiment, the present invention is inspired by a profile of this type, which has a rounded shape at the top of the tooth.

In particular, suitably according to the present invention, at least one tooth 11 of the gear wheel 10 is shaped so as to comprise a cutting edge 12 at at least a portion 13 thereof, for example at the top of the tooth.

The cutting edge 12 of the tooth 11 is an active end thereof adapted to remove material in the form of chips from a body which is in contact with the cutting edge, for example from the surface of the housing holes of the pump casing, in particular during the rotation of the gear wheel 10 in the running-in phase of the apparatus in which it is housed, as will be illustrated in greater detail below.

Following the processing of the tooth 11, the function that defines its profile P is therefore suitably modified, for example by introducing a discontinuity or in general an irregularity.

With reference to the schematic and non-limiting example of FIG. 3, the cutting edge 12 is obtained as the edge of a longitudinal groove 14 which preferably affects the entire length or depth of the tooth 11 or of the wheel 10.

In other words, according to the present invention, the teeth 11 of the gear wheel 10 are provided with at least one cutting surface for removing material during the rotation of the wheel. This configuration entails considerable advantages, especially during the running-in phase of the pump, as will be described in detail below.

As mentioned above, the portion 13 of the tooth 11 in which the cutting edge 12 is formed is a top portion of said tooth 11, where the term "top" means herein the portion of the tooth furthest from the center O of the primitive circle of the gear wheel 10. Furthermore, in a preferred embodiment of the present invention, the cutting edge 12 extends over the entire length or depth of the tooth 11, where the term "length of the tooth" means herein the dimension of the tooth 11 along a direction parallel to the axis of rotation H-H.

Figure 4:
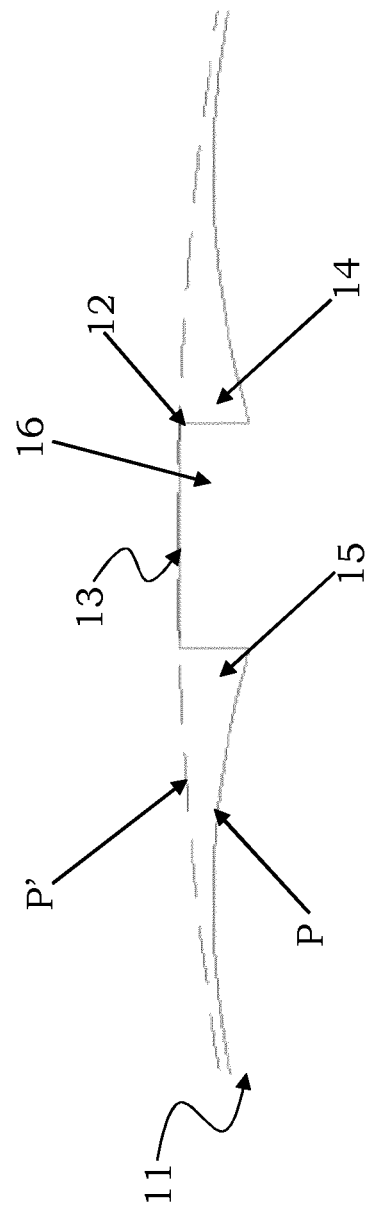
FIG. 4 shows a detail of the profile of the gear wheel according to the present invention.

As better illustrated in FIG. 4, the cutting edge 12 is obtained by removing material from the tooth 11, in particular at the portion 13 of the tooth 11, for example at at least one side of said portion 13, forming the aforementioned groove 14 extended longitudinally along the development (depth) of the tooth 11. In a preferred embodiment of the present invention, a second groove 15 analogous to the groove 14 is formed parallel to the previous groove 14 (for instance at another side of the portion 13), defining between said grooves a projection 16 corresponding, in this embodiment, to the portion 13.

In FIG. 4, the reference P' indicates the profile of the tooth of the known solutions, having a typical round or rounded shape without interruption, while the profile P of the tooth 11 of the present invention has, in its section, the projection 16 obtained by the aforementioned material removal by means of the two parallel grooves 14 and 15, with the formation of the cutting edge 12 for example on a longitudinal edge of the projection 16.

The processing techniques of the gear wheel 10 are many and the present invention is not limited to one of them in particular. For example, in an embodiment of the present invention, the shape of the cutting edge 12 is obtained by shape grinding to obtain the groove 14 (and consequently the cutting edge 12) by using for example a single shaped grinding wheel, or it is obtained by using a screw grinding wheel.

In an embodiment of the present invention, the grinding of the outer diameter of the gear wheel 10 is achieved by means of round grinding machines, so that the function which defines the profile P of the teeth 11 describes, at the top of each tooth, an arc of a circle centered on the axis of rotation H-H of the gear wheel 10 and having a diameter equal to (or greater than) a diameter of the housing hole, as indicated above.

Again by way of non-limiting example, with respect to the maximum height of the tooth 11 (substantially preferably corresponding to the maximum height of the teeth of the known solutions), the modification of the known profile due to the material removal can lead to a decrease in the height of the tooth (at the foot of the cutting edge 12) equal to about 0.1 mm, this value shrinking more and more as we move away from the cutting edge 12, resulting in a protrusion of the projection 16 with respect to the rest of the remaining profile of about 0.03 mm.

Figure 5:
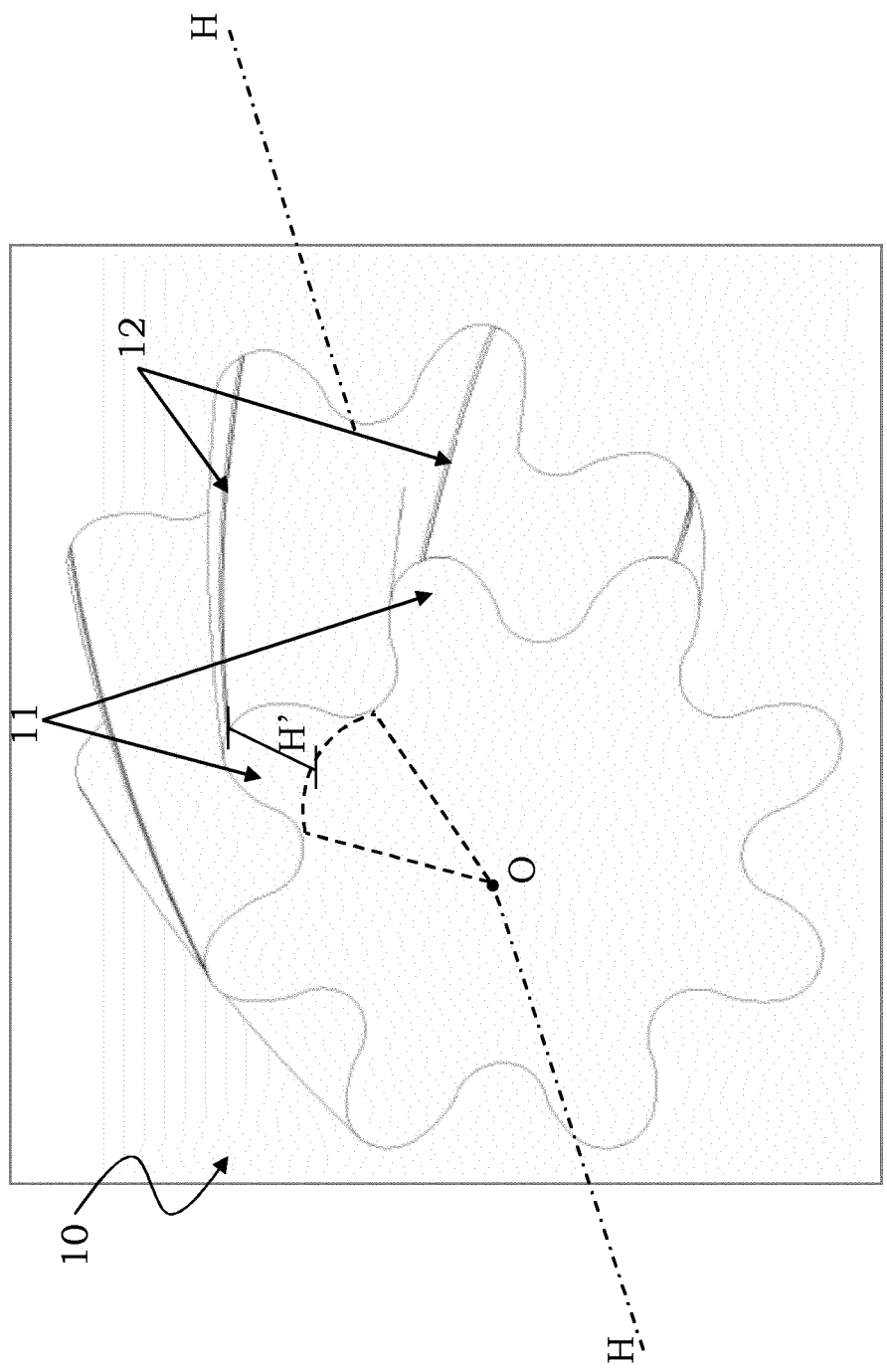
FIG. 5 shows a perspective view of the gear wheel according to the present invention.
Figure 6:
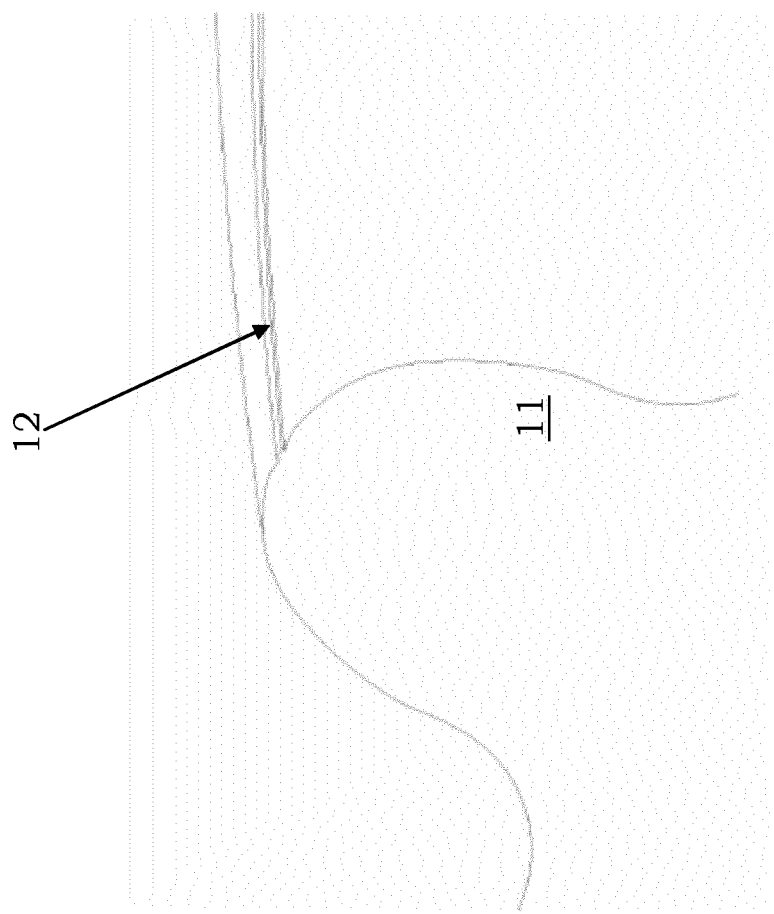
FIG. 6 shows a perspective view of a tooth of the gear wheel according to the present invention.

In a preferred embodiment, illustrated in FIG. 5, each tooth 11 of the gear wheel 10 comprises the cutting edge 12, even if other solutions are within the scope of the present invention; it is in fact possible to provide for a configuration in which the cutting edge 12 is present only on some teeth of the gear wheel, for example a configuration in which a tooth comprising the cutting edge alternates with a tooth that does not include any cutting edge.

Furthermore, it is also possible to provide an embodiment in which at least one tooth 11 comprises a plurality of cutting edges 12 spaced from each other along the profile P, for example equally spaced, such as for example the teeth of a saw. In other words, in this embodiment, the tooth 11 comprises a plurality of portions 13 which have the cutting edge 12, said portions being spatially spaced from each other (for example, equally spaced) along the profile P of the tooth 11.

As mentioned above, the cutting edge 12 introduces a discontinuity in the function that defines the profile P of the tooth 11, for example a discontinuity of the first kind (for example in the form of a step), in which at the left of the cutting edge 12 the function that describes this profile P approaches the cutting point with a value that is different from the one it has when approaching from the right.

In another embodiment of the present invention, the cutting edge 12 introduces a point of non-differentiability in the function that defines the profile P of the tooth 11. For example, the cutting edge 12 can introduce a corner point or a cusp.

Figure 7:
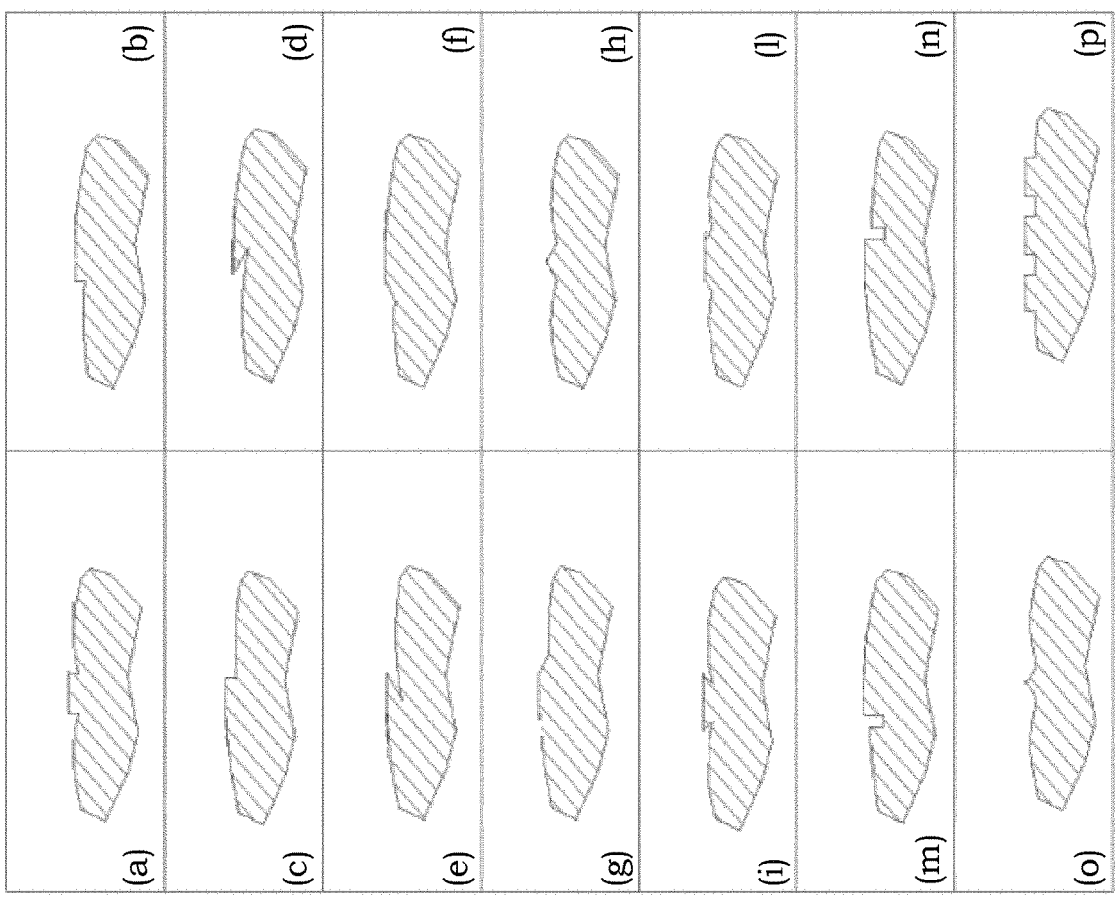
FIG. 7 schematically shows embodiments of a gear wheel according to the present invention.

All said different profiles are illustrated schematically and not exhaustively in FIG. 7, which shows that the principles of the invention are applicable to a large number of possible shapes for the profile P of the tooth 11. It is observed in fact that the present invention is not limited to a particular shape of the teeth 11, in particular of the tooth portion 13 comprising the cutting edge 12, which can vary according to the needs and/or circumstances.

More specifically, FIG. 7 shows various alternative solutions indicated with the letters from (a) to (p) which illustrate a section of the tooth 11 at portion 13 (i.e. a top portion). The solution (a) substantially corresponds to the example embodiment of FIGS. 3 to 6 discussed above, while the other solutions can be considered as alternative embodiment.

Consequently, the tooth portion 13 comprising the cutting edge 12 can be considered a projection 16 formed in the top profile, as for example in the embodiment of FIGS. from 3 to 6 and of FIG. 7(a), or in general obtained by means of at least one longitudinal groove 14, preferably extended over the entire length of the tooth.

In the context of the present invention, the projection 16 of the embodiment of FIGS. 3 to 6 and of FIG. 7(a) is to be understood in a relative way with respect to the depression (dip) at the flanks of said projection; in other words, the projection 16 is a discontinuity made by means of at least one groove 14 extended over the entire length or depth of the tooth, and it does not protrude much beyond the rounded line of the effective profile P of tooth 11 (it protrudes in fact preferably by about 0.03 mm, generally in a range from 0.01 mm to 1 mm), and defines the cutting edge 12 in at least one edge where a change of level with respect to the center O of this tooth 11 occurs. In any case, the maximum height at the projection 16 is preferably substantially equal to the maximum height of the profile of the tooth of the known solutions, from which material is then removed as illustrated above, obtaining said projection 16.

In one embodiment, the projection 16 has a width (intended as a transverse dimension with respect to the length of the tooth) between 0.01 mm and 1 mm.

In other words, the cutting edge 12 is made by means of at least one groove 14 which is lowered by an amount from 0.2% to 5%, preferably from 0.2% to 1.5%, still more preferably 0.8%, of the height H' of the tooth 11, the groove 14 decreasing away from the cutting edge 12 along the profile P of said tooth 11. For example, the cutting edge 12 introduces, at the top of the tooth 11, a discontinuity in the function that defines the profile P of said tooth 11 made by means of such lowered groove 14. In the context of the present invention, the term height H' means the distance between the top of the tooth and the base at the primitive circle, for example measured along a direction orthogonal to the length of the tooth.

For example, for a tooth 11 having a height of 3.93 cm, the groove 14 can vary from 0.01 to 0.2 cm, preferably 0.03 cm. The maximum values of the range indicated above are more suitable for large-sized teeth, for example having a height greater than 10 cm.

Advantageously, the described configuration allows to obtain an extremely resistant cutting edge 12 which is not subject to breakage, since it protrudes very little. Furthermore, the described configuration can be easily made with no need for complicated processing, requiring only a minimal removal of material to form the aforementioned groove 14.

The cutting edge 12 is arranged at a rim of the portion 13 (i.e. it is the edge of said portion), which therefore can have any shape, for example a square or a wedge shape. In general, the tooth 11 has thus a profile P provided with a sharp portion.

It is further observed that the profile P of the tooth 11 can be a symmetrical profile (such as the profile of the embodiment of FIGS. 3 to 6 and of FIG. 7(a)), or the profile P can be an antisymmetric profile.

In an embodiment of the present invention, the teeth 11 are helical teeth, and the gear wheel 10 has a number of teeth between 5 and 21, preferably 5-11, still more preferably 8.

Furthermore, the gear wheel 10 according to the present invention, when it is helical, has a helical pitch $P_e$ (measured in mm) equal to $(F*n)/0.5 > P_e > (F*n)/1.3$, preferably $P_e = (F*n)/0.7$, where F is the gear wheel band length and n is the number of teeth.

Obviously, the principles of the invention also apply to bi-helical gear wheels, such as for example gear wheels of the type described in patent application number 102016000076227 in the name of the Applicant, as well as apply to gear wheels with straight teeth.

The above described configuration adopted for the gear wheel 10 has numerous advantages and allows to effectively solve the technical problem of the present invention.

Figure 8:
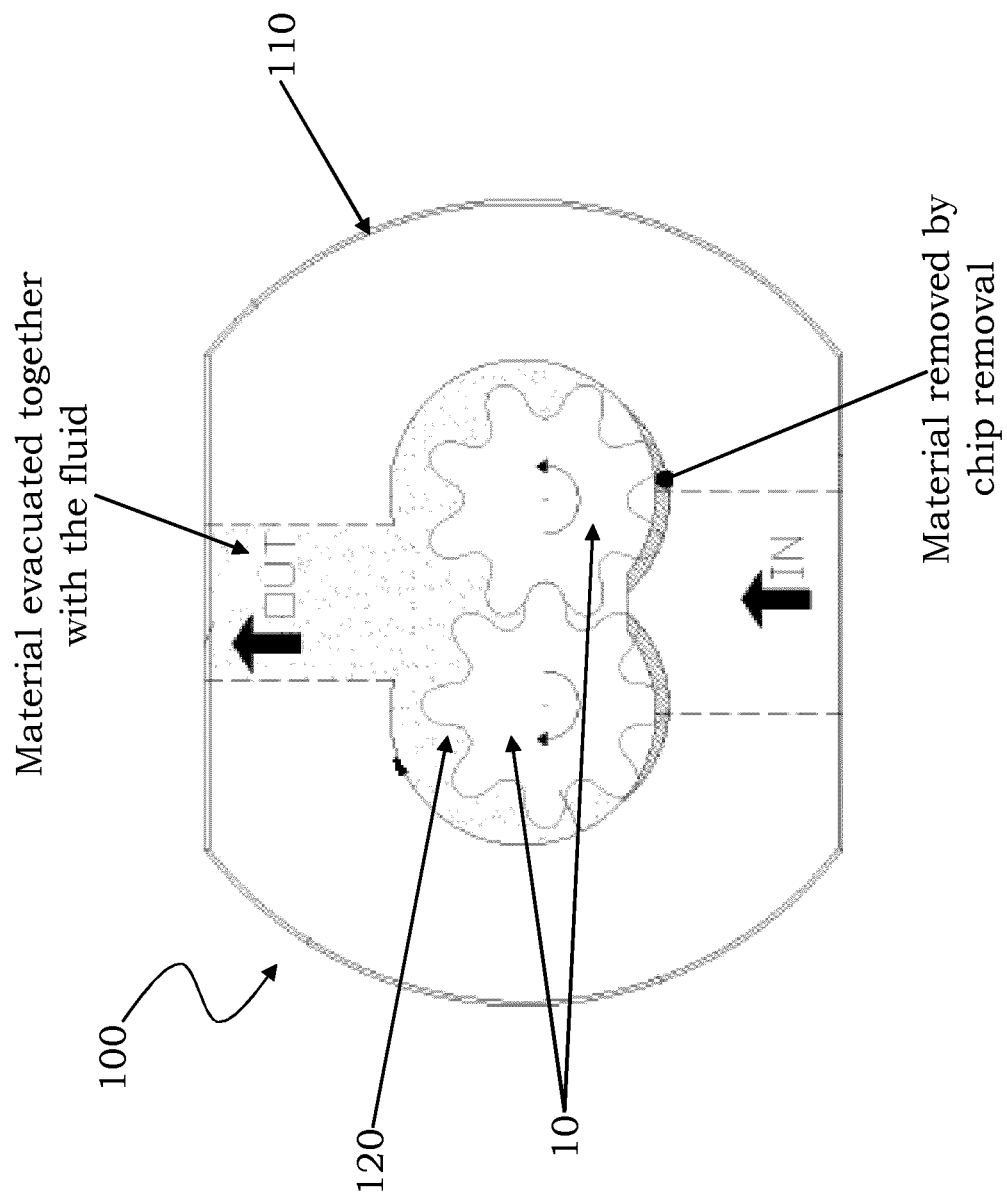
FIG. 8 schematically shows a hydraulic apparatus comprising gear wheels according to the present invention.

In this regard, referring to FIG. 8, a hydraulic apparatus 100 including a pair of gear wheels 10 according to the present invention is disclosed.

In their mutual rotation, the gear wheels 10 cause meshing between respective cooperating teeth.

As indicated above, the grinding of the outer diameter of the gear wheel 10 is such that the function that defines the profile P of the teeth 11 describes, at the top of each tooth, an arc of a circle centered on the axis of rotation H-H of the gear wheel 10 and having a diameter equal to a diameter of a hole housing the wheel, except for processing tolerances.

In one embodiment, the starting shape of the tooth 11 at the top thereof is expressed by a function that describes an arc of a circle or ellipse, whose center or foci are located inside the tooth itself (between the outer diameter and the inner diameter of the gear wheel).

The improved profile comprising the cutting edge allows in any case to obtain gear wheels having a "continuous contact" along almost the whole profile, that is, there is a single theoretical contact point that moves from one flank of the gear wheel to the other one with continuity, without generating areas of entrapment of fluid during meshing (i.e. not encapsulating fluid). The aforesaid contact does not take place only in the portion affected by the cutting edge 12. In this case, a small encapsulation volume is created, but the cutting edge 12 is designed and sized in such a way as to make said modification completely imperceptible. In fact, from tests carried out by the Applicant, there are no volumetric losses due to leakage of the pumped fluid and the excellent characteristics of noiselessness of these apparatuses are maintained.

The non-incapsulating profile is thus suitably modified by introducing the cutting edge 12 of the present invention.

In another embodiment, the starting profile on which the cutting edge is made is a so-called semi-encapsulating profile, wherein an area of entrapment or encapsulation of fluid is formed between the teeth of two meshing wheels, said area decreasing gradually during the rotation of the wheels, until it is substantially cancelled off when the head of a tooth of a gear wheel touches the bottom of a tooth of the other wheel.

The apparatus 100 comprises a casing or body 110, which is provided with housing through holes 120 for housing the gear wheels 10.

As mentioned above, the hydraulic apparatus 100 can be a volumetric rotary gear pump or a hydraulic motor.

During the operation of the apparatus 100, it is known that, under the action of the force due to the pressure of the fluid transported by the gear wheels 10, there is an elastic yielding of the plain bearings housed in the bushes. This yielding is proportional to the operating pressure, to the length of the rotors and depends also on the materials used. All this causes the occurrence of mechanical interference between the inner wall of the housing holes 120 of the casing 110 and the gear wheels 10.

The gear wheels 10 are made of a material, for example steel, having a hardness that is greater than the material of the casing 110, for example aluminium, so that the aforementioned mechanical interference between the gear wheels 10 and the casing 110 generates, in the known solutions, a wear phenomenon due to plastic deformation, in particular due to the particular shape of the rotor tooth, which is rounded at the tip.

Advantageously according to the present invention, the cutting edge 12 is configured to remove chip material from the inner surface of the housing holes 120 of the casing 110, which is contacted by the cutting edge during the rotation of the gear wheels 10.

In this way, during the running-in phase, the cutting edge 12 acts by removing material in the form of chips, which is then expelled together with the pumped fluid from the delivery port with limited or even absence of fill/spreading of material on the inner surface of the housing holes 120. The final geometry of the housing hole (which can be expected with modest tolerance dimensions) does not affect the performance of the apparatus.

It is therefore evident that, at the end of the running-in phase, all the problems caused by the deposition/spreading of unwanted material on the internal surface of the housing hole no longer occur, such spreading resulting, in some known solutions, in an unwanted and completely random modification of the mechanical plays that leads to different performances and difficult starting in cold conditions, with consequent loss of volumetric efficiency.

The innovation made to the profile P of the tooth 11 of the gear wheel 10 therefore allows to improve the performance and the working life of the hydraulic apparatus 100 which incorporates said gear wheel 10, by speeding up the running-in times and ensuring an improvement in the overall quality in terms of constancy, reliability and repetitiveness of the parameters characterizing it. The cutting edge 12 on the top of the teeth 11 in fact eliminates the problems of some known profiles which, due to the exclusively round shape, sometimes creates irreversible damage to the body of the apparatus itself at the end of the running-in phase.

The adopted configuration allows in any case to minimize the losses due to fluid leakage, and in general the pump performance is in no way affected by the presence of the cutting edge 12.

While not altering the performance, such a configuration allows in any case a significant improvement in terms of reliability, repeatability of performance, wear, durability, mechanical and volumetric yield, in particular due to the particular shape of the cutting edge.

Finally, it should be noted that all the advantages of the known solutions with continuous contact (and also of the solutions with semi-encapsulation of fluid) are maintained, since the profile is minimally modified only at the top for forming the cutting edge 12 (which does not protrude to much since the depth of the groove is very little), which allows to always guarantee maximum performance even after the running-in phase, said cutting edge 12 suitably removing chip material that is subsequently expelled together with the fluid pumped into the apparatus.

Tests carried out by the Applicant have demonstrated that the extremely small dimensions of the cutting edge 12 do not entail any drawback in the post-running-in phase of the pump, on the contrary they represent a minimum escape route for micro-encapsulations of fluid which are easily discharged while keeping the noiselessness of the pump extremely reduced.

Obviously, a person skilled in the art, in order to meet contingent and specific requirements, may make to the gear wheel, to the apparatus and to the method above described numerous modifications and variations, all included in the scope of protection of the invention as defined by the following claims.

What is claimed is:

1. A gear wheel for a hydraulic apparatus, comprising a plurality of teeth and arranged to be rotatable about an axis of rotation, said teeth having a sectional profile and being adapted to mesh with respective teeth of another gear wheel during a rotational motion about the axis of rotation, wherein at least one tooth is shaped so as to have at least one cutting edge configured to remove material from a body which is contacted by said at least one cutting edge during the rotation of said gear wheel, characterized in that said at least one cutting edge is defined by at least one groove which is lowered, with respect to a rounded starting profile, by an amount from 0.2% to 5% of the height of said tooth, said at least one groove decreasing away from the at least one cutting edge along the sectional profile, wherein the sectional profile corresponds to the rounded starting profile except for the at least one groove; wherein the at least one groove forms a projection which protrudes with respect to a rounded profile of the tooth by an amount from 0.01 mm to 1 mm; wherein the projection has a width from 0.01 mm to 1 mm.

2. The gear wheel according to claim 1, wherein the at least one cutting edge is at a top portion of said tooth, the top portion being the tooth portion farthest from the center of a primitive circle of the gear wheel.

3. The gear wheel according to claim 1, wherein the at least one cutting edge extends over the entire length of the tooth, the length of the tooth being the dimension of the tooth in a direction parallel to the axis of rotation.

4. The gear wheel according to claim 1, wherein each tooth comprises said at least one cutting edge.

5. The gear wheel according to claim 1, wherein at least one tooth comprises a plurality of cutting edges spaced from each other.

6. The gear wheel according to claim 1, wherein the at least one cutting edge is such as to introduce a discontinuity in the function that defines the sectional profile of the tooth, said at least one cutting edge being arranged at the point of discontinuity.

7. The gear wheel according to claim 6, wherein said discontinuity is a jump discontinuity.

8. The gear wheel according to claim 1, wherein the at least one cutting edge is such as to introduce a point of non-differentiability in the function that defines the sectional profile of the tooth.

9. The gear wheel according to claim 1, wherein the sectional profile of the tooth is a symmetrical profile.

10. The gear wheel according to claim 1, wherein the at least one cutting edge is an edge of the at least one groove, which is formed along a longitudinal axis of the tooth, the longitudinal axis being an axis parallel to the axis of rotation.

11. The gear wheel according to claim 10, wherein the at least one cutting edge is the edge of a portion having a square shape or a wedge shape.

12. The gear wheel according to claim 1, wherein said teeth are helical or bi-helical teeth.

13. The gear wheel according to claim 1, having a number of teeth between 5 and 21.

14. The gear wheel according to claim 1, wherein the function that defines the profile of the teeth describes, at the top of the teeth, an arc of a circle centered on the axis of rotation of the gear wheel and having a diameter equal to or greater than a diameter of a hole housing said gear wheel, the top of the teeth being the tooth portion furthest from the center of a primitive circle of said gear wheel.

15. The gear wheel according to claim 1, wherein the at least one cutting edge is obtained by removing material from said tooth.

16. The gear wheel according to claim 15, wherein the shape of the at least one cutting edge is obtained by shape grinding using a single shaped grinding wheel or a screw grinding wheel.

17. A hydraulic apparatus comprising:
a casing; and
a pair of gear wheels, wherein at least one of said gear wheels is according to claim 1, said gear wheels being housed in housing holes in said casing,
wherein the at least one cutting edge is configured to remove material from an inner surface of the housing holes of the casing, which is contacted by said at least one cutting edge during the rotation of the gear wheels.

18. The hydraulic apparatus according to claim 17, wherein said hydraulic apparatus is a geared rotary positive displacement pump or a hydraulic motor.

\* \* \* \* \*